(12) United States Patent
Yuan

(10) Patent No.: US 10,134,033 B2
(45) Date of Patent: Nov. 20, 2018

(54) PAYMENT SYSTEM AND METHOD USING IC IDENTIFICATION CARD

(75) Inventor: Leiming Yuan, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 950 days.

(21) Appl. No.: 12/092,064

(22) PCT Filed: Mar. 11, 2008

(86) PCT No.: PCT/US2008/056532
§ 371 (c)(1),
(2), (4) Date: May 4, 2010

(87) PCT Pub. No.: WO2008/121507
PCT Pub. Date: Oct. 9, 2008

(65) Prior Publication Data
US 2010/0241572 A1    Sep. 23, 2010

(30) Foreign Application Priority Data
Mar. 29, 2007 (CN) .......................... 2007 1 0091707

(51) Int. Cl.
G06Q 20/38 (2012.01)
G06Q 20/02 (2012.01)
G06Q 20/40 (2012.01)

(52) U.S. Cl.
CPC ......... *G06Q 20/3823* (2013.01); *G06Q 20/02* (2013.01); *G06Q 20/40* (2013.01); *G06Q 20/401* (2013.01)

(58) Field of Classification Search
USPC ........................................................ 705/75
See application file for complete search history.

(56) References Cited

U.S. PATENT DOCUMENTS 5,530,232 A    6/1996 Taylor
5,680,459 A *  10/1997 Hook .................. G06K 7/0008
                                                        705/13

(Continued)

FOREIGN PATENT DOCUMENTS

CN    1707530 A    12/2005
CN    1764105 A    4/2006

(Continued)

OTHER PUBLICATIONS

Radio Frequency Identification RFID a basic primer Version 1.2 Aug. 23, 2001.*

(Continued)

*Primary Examiner* — Zeshan Qayyum
(74) *Attorney, Agent, or Firm* — Lee & Hayes, PC

(57) ABSTRACT

A payment system utilizes an IC identification card to identify a user, finds and verifies a bank account of the user. The payment system uses an IC identification card reader to read user identity information which includes a user identification card number. The system encrypts user identity information using a first encryption key and encrypts the user-entered bank account password using a bank encryption key corresponding to a participating bank, and sends the encrypted information to an intermediary platform, which sends a bank transaction request including user identity information, bank account password and transaction amount to the participating bank subsystem. The participating bank subsystem conducts the requested bank transaction with a user bank account, which is determined according to the user identification card number either by the intermediary platform or by the participating bank subsystem based on a mapping relationship between the user identity information and bank accounts.

19 Claims, 12 Drawing Sheets

(56) References Cited

U.S. PATENT DOCUMENTS

| | | | |
|---|---|---|---|
| 6,003,014 A | 12/1999 | Lee et al. | |
| 6,098,053 A * | 8/2000 | Slater | 705/44 |
| 6,494,367 B1 * | 12/2002 | Zacharias | 235/382 |
| 7,039,809 B1 * | 5/2006 | Wankmueller | 713/182 |
| 7,832,646 B1 * | 11/2010 | Leason | 235/492 |
| 2002/0049908 A1 * | 4/2002 | Shimosato | G06Q 20/341 713/186 |
| 2002/0077837 A1 | 6/2002 | Krueger et al. | |
| 2003/0028481 A1 * | 2/2003 | Flitcroft | G06Q 20/00 705/39 |
| 2005/0211784 A1 | 9/2005 | Justin | |
| 2005/0247777 A1 | 11/2005 | Pitroda | |
| 2006/0080247 A1 * | 4/2006 | Keohane et al. | 705/42 |
| 2006/0118617 A1 * | 6/2006 | Matsumoto | G06Q 20/06 235/380 |
| 2007/0119920 A1 * | 5/2007 | Hogg | G06Q 20/04 235/380 |
| 2007/0276765 A1 * | 11/2007 | Hazel | G06F 21/72 705/71 |

FOREIGN PATENT DOCUMENTS

| | | |
|---|---|---|
| CN | 1818917 A | 8/2006 |
| CN | 1835008 A | 9/2006 |
| JP | 2003263566 A | 9/2003 |
| JP | 2005063248 | 3/2005 |
| JP | 2007537506 A | 12/2007 |
| WO | WO0129789 | 4/2001 |
| WO | WO2005109887 | 11/2005 |

OTHER PUBLICATIONS

Extended European Search Report dated Jun. 28, 2011 for European application No. 08731908.3.
Translated Japanese Office Action dated Dec. 14, 2012 for Japanese patent application No. 2010-501050, a counterpart foreign application of U.S. Appl. No. 12/092,064, 4 pages.
European Office Action dated Feb. 4, 2016 for European Patent Application No. 08731908.3, a counterpart foreign application of U.S. Appl. No. 12/092,064, 6 pages.
European Office Action dated Oct. 10, 2017 for European patent application No. 08731908.3, a counterpart foreign application of U.S. Appl. No. 12/092,064, 8 pages.
Translated Japanese Office Action dated Sep. 20, 2013 for Japanese patent application No. 2010-501050, a counterpart foreign application of U.S. Appl. No. 12/092,064, 4 pages.
Translated Chinese Office Action for Chinese Patent Application No. 200710091707.8, dated Dec. 21, 2011, a counterpart foreign application of U.S. Appl. No. 12/092,064, 5 pages.
Translated Chinese Office Action for Chinese Patent Application No. 200710091707.8, dated Aug. 24, 2011, a counterpart foreign application of U.S. Appl. No. 12/092,064, 4 pages.
Translated Chinese Office Action for Chinese Patent Application No. 200710091707.8, dated Nov. 25, 2010, a counterpart foreign application of U.S. Appl. No. 12/092,064, 4 pages.

* cited by examiner

PAYMENT SYSTEM AND METHOD USING IC IDENTIFICATION CARD

RELATED APPLICATIONS

This application is a national stage application of international patent application PCT/U.S.08/56532, filed Mar. 11, 2008, claiming priority from Chinese patent application, Application No. 200710091707.8, filed Mar. 29, 2007, entitled "PAYMENT SYSTEM AND METHOD USING IC IDENTIFICATION CARD".

BACKGROUND

This disclosure is related to the field of data processing technologies, and particularly a payment system and a method for trading using an IC identification card.

As it is inconvenient and unsafe to carry lots of cash around, bank cards have been used widely for many different transaction occasions. More and more people are using bank cards for shopping. FIG. 1 shows a schematic block representation of an existing payment system that uses a bank card for processing transaction. In this existing system, there are a receiving terminal 113 which reads bank card information, a merchant subsystem 112, and an acquiring subsystem 111. The merchant subsystem 112 usually has a server and several customer terminals (not shown). The customer terminals at the merchant subsystem 112 connect to the receiving terminal 113 while the server of the merchant subsystem 112 connects to the acquiring subsystem 111 of an acquirer through a special designated line. When the acquirer of the acquiring subsystem 111 and participating bank are not the same, a connection from the acquiring subsystem 111 to the acquiring subsystem (not shown) of the participating bank is further made through an inter-bank trading subsystem of partnering banks (such as UnionPay of China).

When a user uses a bank card to make a payment using the payment of FIG. 1, receiving terminal 113 (e.g., a cash register) first verifies the authenticity of the bank card based on the readability of the bank card. Afterwards, customer terminal of merchant subsystem 112 transmits identity information (which has been entered by the user to present the user identity), the bank card number and other transaction information to a server of merchant subsystem 112. The server of the merchant subsystem 112 subsequently sends the information to acquiring subsystem 111. If acquirer and participating bank are the same, the acquiring subsystem 111 processes the transaction directly. Otherwise, this information is sent to the participating bank through an inter-bank trading subsystem. A participating bank subsystem uses the bank card information and the identity information to verify the identity of the user. If identity is validated, the participating bank subsystem processes a deduction from an account of the card number, and returns a bank transaction result of this deduction. If verification fails, the participating bank subsystem returns a message indicating that the identity cannot be verified. After the merchant subsystem 112 receives the message that deduction was successfully made, the merchant can then allow the customer (the user) to sign a sales slip for validation.

The above description shows the most common payment transaction process in the existing technologies. However, this payment process has certain flaws as discussed below.

In the payment process of FIG. 1, a bank card with a combination of account name and password are used to authenticate the user identity in the whole transaction. The method of authentication of the bank card relying the bank card by terminals such as Point-Of-Sales (POS) and Automated Teller Machine (ATM) in existing technologies has posed very high risks. Current bank cards are made using magnetic strip card technology. Since the anti-counterfeit capability of magnetic strip cards is low, these cards may be easily imitated or counterfeited.

As a result, smart card has been proposed recently to replace the magnetic strip card as a new generation of the bank card. A smart card, also called chip card, integrated circuit (IC) card, or simply IC card, is a pocket-sized card with embedded integrated circuits which can process information. A smart card can receive an input, process the input, and deliver it as an output. The card is made of plastic, generally PVC, but sometimes ABS. The card may embed a hologram to avoid counterfeiting. For example, one can use EMV technology to produce smart card. EMV is a standard for smart IC bank card technology developed together by international bank card organizations such as Europay, Master and Visa. This standard requires a CPU chip of the bank card to have standalone operations, encryption and decryption functions, as well as storage capability, thereby achieving a higher level of security.

However, the transformation of bank card from magnetic strip card to smart card has proven to be very costly and slow. The cost to manufacture a smart card is many times higher than that of a magnetic strip card. In addition, it is very expensive to modify the existing POS and ATM so that they can read smart cards. Even if the bank card's transformation from magnetic strip card to smart card could be made despite the huge cost of money and resources, penetrators would still be motivated and be able to imitate smart cards due to the existence of large profits. Furthermore, even though terminals such as ATM and POS may read the bank card and verify the authenticity of the bank card, they cannot confirm whether the bank card is the same bank card issued by a financial institution to the user, or whether the rightful user is using the smart card issued by the financial institution. Because there is no other practical ways to verify user identity, if penetrators obtain user information such as password, serious financial losses to the user and merchant may follow. In the existing technologies, after ATM and POS have received a bank account password entered by the user and read the bank account information of the bank card, usually only the bank account password is encrypted before it is transmitted over the network. Important financial information such as bank account numbers and transaction amounts are sent in plaintext format. If penetrators have obtained the bank account password through illegal means, it becomes very easy to obtain the financial information such as bank account numbers, potentially leading to financial losses for the real users and greatly reducing the security of bank transactions.

From another perspective, the transformation of bank card from magnetic strip card to smart card will not happen overnight. As such, there is a need for another practical method of verifying user identities in a payment process to guarantee the security of the transaction.

SUMMARY

This disclosure provides a payment system and a method for trading using an IC identification card in order to solve the problem of low security in existing technologies that uses a bank card for processing transaction.

A payment system utilizes an IC identification card to identify a user, finds and verifies a bank account of the user.

The payment system uses an IC identification card reader to read user identity information which includes a user identification card number. The system encrypts user identity information using a first encryption key and encrypts the user-entered bank account password using a bank encryption key corresponding to a participating bank, and sends the encrypted information to an intermediary platform. The intermediary platform sends a bank transaction request including the user identity information, a bank account password and a transaction amount to the participating bank subsystem. The intermediary platform may decrypt and/or encrypt some of the information. The participating bank subsystem conducts the request at bank transaction with a user bank account, which is determined according to the user identification card number either by the intermediary platform or by the participating bank subsystem.

The intermediary platform may obtain the user bank account number based on the mapping relationship between the user identity information and bank accounts, and include the user bank account number in the bank transaction information sent to the participating bank subsystem. If the transaction information does not contain a bank account number, the participating bank subsystem may look up the bank account number corresponding to the user identification card number, verifies bank account password after decryption, processes the transaction and returns a bank transaction result.

In some embodiments, an input unit separate from the identification card reader is used for receiving the user bank account information such as a bank account password. The separate input unit may also be used for receiving trade transaction information such as transaction amount.

Various encryption schemes may be used to enhance security. In one embodiment, the accepting device of the payment system has two ciphers for encryption. The first cipher is used for encrypting the user identity information using a first encryption key, while the second cipher is used for encrypting the user bank account information (such as a user bank account password) using either a bank encryption key provided by the participating bank or a bank encryption key provided by a third party. A third cipher may also be optionally used for encrypting the transaction amount. At the intermediary platform, the user identification information and the transaction amount are decrypted by a matching decryption key. The encrypted user bank account password may be passed by the intermediary platform onto the participating bank subsystem to be decrypted and verified. Alternatively, the user bank account password may be decrypted by the intermediary platform and subsequently sent to the participating bank subsystem. Furthermore, the intermediary platform may also encrypt the bank transaction information before sending it to the participating bank subsystem to be decrypted, verified and applied.

Using an IC identification card for payment transaction, the disclosed payment system and method benefits from the high-quality encryption, high safety and widespread use of the IC identification cards (the second-generation identification cards in some countries) to reduce costs and enhance security.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
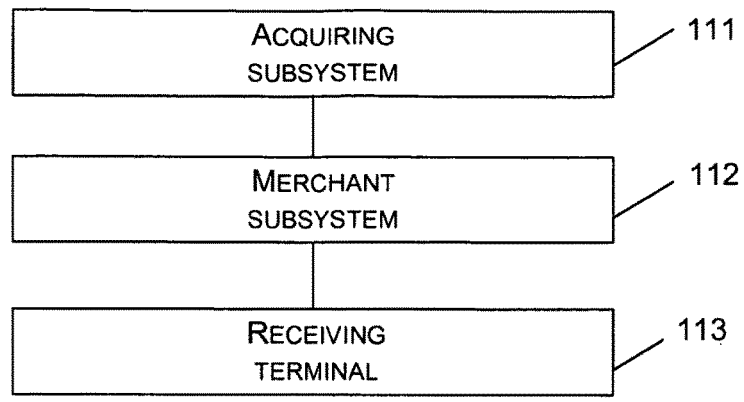
FIG. 1 shows a schematic block representation of an existing payment system that uses a bank card for processing transaction.

The payment system and method use an IC identification card (an identification card having an IC chip or an IC card used as identification) such as second-generation identification cards used in some countries (e.g. China) for processing payment transaction. The disclosed payment system and method take advantage of the features (such as high-quality encryption and widespread use) of the IC identification cards which are already been widely used in some countries and regions, and quickly becoming so many more countries and regions. One advantage of IC identification cards over smart bank cards is that the former may have widespread use already, and if not will soon in some countries, regardless of any commercial use of them for business transactions. Because IC identification cards are implemented by the government, they tend to have a high degree of penetration in the population and fewer obstacles to obtain a uniform standard in both hardware and software implementation. In contrast, smart bank cards are manufactured and issued by each issuing financial institution to their customers, often in addition to the already existing IC identification cards. For users who are customers of multiple banks, multiple smart bank cards may need to be made for them. If the banks don't collaborate with each other, not only will there be multiplicity of the smart bank cards, but also different standards and technologies used for different smart bank cards.

As will be illustrated, the disclosed payment system and method establishes a payment procedure at least as secure as that of a smart bank card without incurring the high costs of fabricating the smart bank cards and establishing a separate network of accepting machines for smart bank cards. Using encryption keys in the whole transaction process is some embodiments may further reinforce the security. The disclosed payment system and method may be combined with the use of an existing bank card (such as a conventional magnetic strip card) for further convenience.

Compared with the first-generation identification cards, the anti-counterfeit function of the second-generation identification card has been improved. One exemplary second-generation identification card is made up of nine layers. The two outermost layers record personal identity information, which is printed onto the layers. There is another layer called balancing layer, which is used to guard against static electricity. On the balancing layer, there is an anti-counterfeit film bearing an image and/or logo which can often be holographic. For example, a second-generation identification card used in China bears an image of the Great Wall Beacon Tower and the logo "CHINA" (in Chinese characters). This anti-counterfeit film consists of orange and green anti-counterfeit marks and is developed from a relatively advanced technology. This balancing layer has an IC chip which is eight millimeter long, five millimeter wide and 0.4 millimeter thick. The balancing layer also has two antennas which are coils. The balancing layer is used to avoid personal information from leaking while allowing personal information being read by a designated card reader.

From the perspective of safety function, the new generation IC identification card has two anti-counterfeit measures. One is a digital anti-counterfeit measure which writes personal information into the chip after digital encryption. The anti-counterfeit digital encryption used in this part is generally developed and/or approved by a government agency to ensure that the authorized IC card readers will not recognize the information in the chip unless the information has been properly and legally encrypted by an authorized party. For example, the anti-counterfeit technology for the second-generation identification cards used in China is developed with the national security in consideration and has very high security characteristics. In one example, each geographical region (e.g., a province) has a regional password and each citizen has an individual password.

Another anti-counterfeit measure used in the new generation IC identification cards is anti-fake printing technology. Both sides of the IC identification card may have printed patterns which are difficult to reproduce. This anti-fake printing technology may use many different measures, including holograms.

Because of the adoption of digital anti-counterfeit measure and anti-fake printing measure, the security is greatly increased with the IC identification cards. In addition, because personal identification cards used nationwide touch an important issue of national security, the corresponding card readers are also under tight security control by the government, further increasing the security. For example, in China, in order to improve security of the next generation national personal edification cards, the card readers are solely developed by the Ministry of Public Security of China and is provided to government designated contracted third party vendors only, leaving very little chance for the card reader to be compromised.

Along with the emergence of the second-generation identification cards in some countries and regions, card readers that can read IC identification cards are becoming increasingly available.

Figure 2:
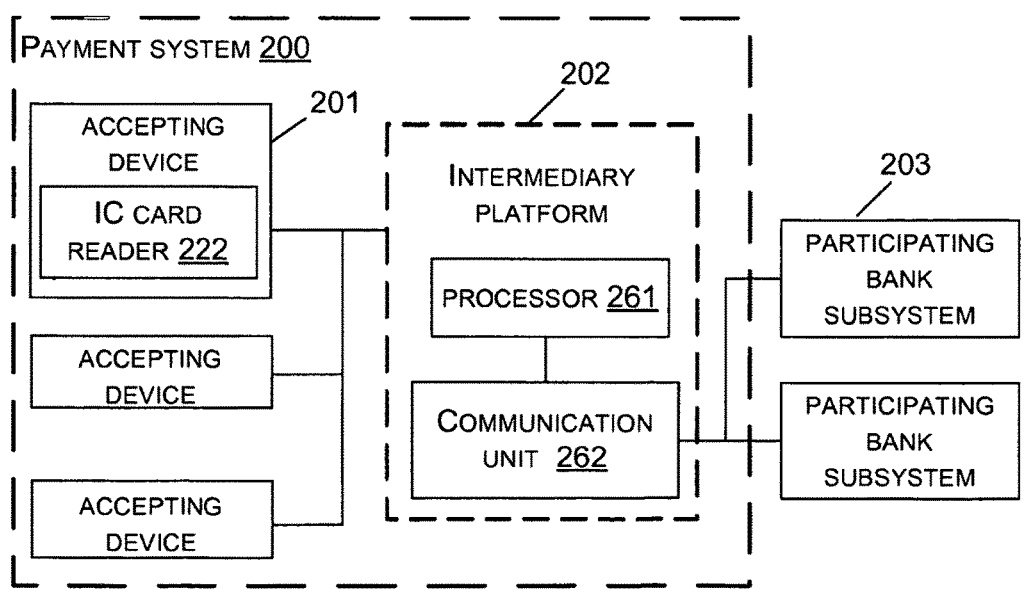
FIG. 2 is a schematic block representation of an exemplary payment system using an IC identification card in accordance with the present disclosure.

FIG. 2 is a schematic block representation of an exemplary payment system using an IC identification card in accordance with the present disclosure. The payment system 200 includes several accepting devices 201 and an intermediary platform 202. The payment system 200 communicates with participating bank subsystems 203 to conduct a bank transaction for making a payment. Each accepting device 201 may represent a merchant doing business with a customer (user) who has a bank account with the participating bank.

The accepting device 201 is adapted for receiving a user identity information, a user bank account information. The user identity information includes a user identification card number read from the user's IC identification card by an IC identification card reader 222, but may also include other user identification information (e.g., a digital photo of the cardholder) which may be either read from the IC identification card by the IC identification card reader 222, or entered through other means. As will be shown below, the accepting device 201 is enabled to encrypt at least part of the user identity information and the user bank account information.

The intermediary platform 202 includes a platform processor 261 and communication unit 262. The intermediary platform 202 receives the encrypted user identity information and the encrypted user bank account information sent from the accepting device 201. As will be shown below, the intermediary platform 202 is enabled to decrypt the encrypted information (such as the user identity information) received from the accepting device 201. The intermediary platform 202 communicates a bank transaction information including the decrypted user identity information and the user bank account information to a participating bank system 203 to request a bank transaction. The intermediary platform 202 receives a bank transaction result from the participating bank system 203, and further communicates the bank transaction result to the accepting device 201 to complete the payment.

Exemplary embodiments of the accepting device 201 are described below with reference to FIGS. 3-6.

Figure 3A:
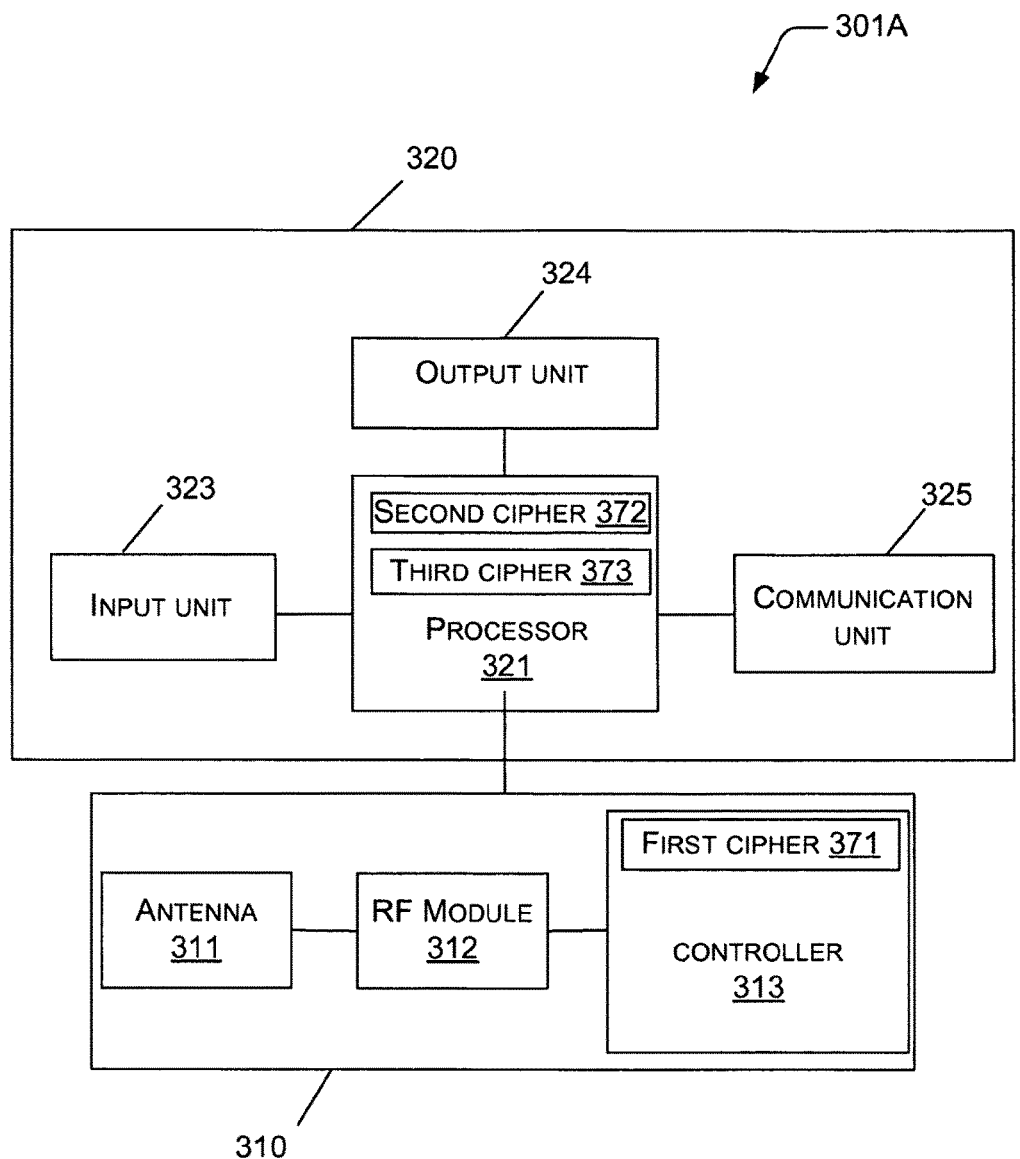
FIGS. 3A, 3B and 3B illustrate several different configurations of a first type accepting device in accordance with the present disclosure.
Figure 3B:
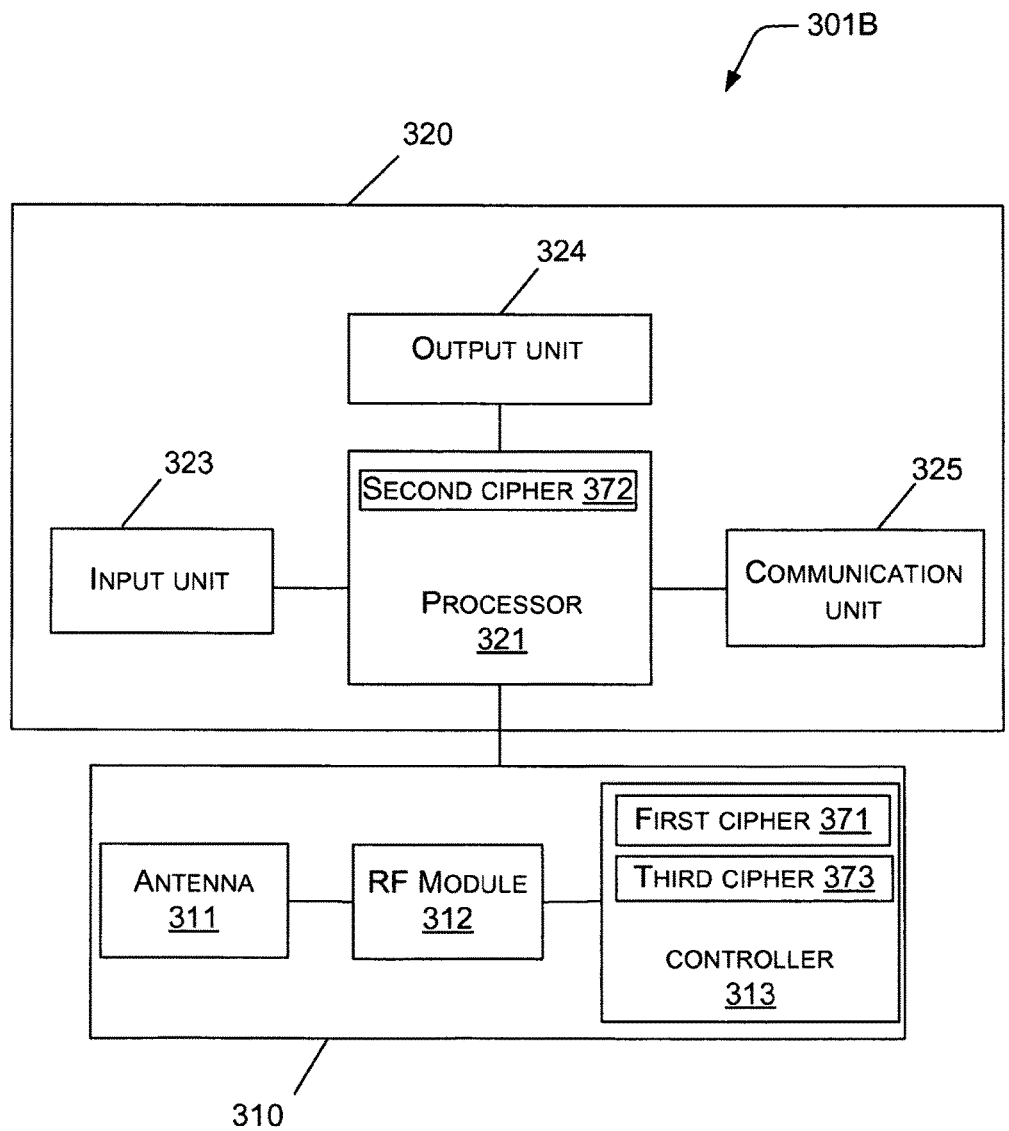

FIGS. 3A, 3B and 3B illustrate several different configurations of a first type accepting device in accordance with the present disclosure. The accepting devices 301A, 301B and 301C of FIGS. 3A, 3B and 3B should be understood with reference to the payment system 200 of FIG. 2 by substituting one of the accepting devices 201 in FIG. 2 with the respective accepting device 301A, 301B or 301C of FIG. 3A, 3B or 3C.

FIG. 3A shows a schematic block representation of a first exemplary configuration of the first type accepting device in accordance with the present disclosure. The accepting device 301A has an identification card reader 310 and a merchant processing unit 320, which includes an acceptor processor 321, a communication unit 325, an input unit 323, and an output unit 324.

The identification card reader 310 is used to read user identity information in user's IC identification card, which includes at least a user identification card number as user identification information. Some IC identification cards may also include a digital photo of the cardholder (user) in the user identity information. In some embodiments, the identification card reader 310 may also incorporate capabilities of reading a conventional bank card to intake bank account information of the user, in addition to reading the user's IC identification card.

The input unit 323 is used for further receiving trade transaction information such as a transaction amount. The input unit 323 may also be used for receiving further information from the user. For example, the input unit 323 may be used for entering bank account information associated with a conventional bank card.

The user may also enter a bank account password, either through the input unit 323 or the IC card reader 310, depending on the configuration. The IC card reader 310 may not come with an integrated user input, and in this case a separate input unit 323 is used for entering such information as a bank account password. The input 323 may also be used for receiving information of the participating bank chosen by the user for payment.

The identification card reader 310 adopts a reader of the IC identification card discussed herein. The identification card reader 310 in FIG. 3A has an antenna 311, a RF module 312 and a controller 313. The antenna 311 connects to the RF module 312 while the RF module 312 connects to the controller 313. The antenna 311 and the RF module 312 are used primarily for receiving identity information in the identification card. During operation, RF module continuously sends out an electromagnetic excitation signal at a fixed frequency. When an IC identification card is placed close to the identification card reader 310, the coil in the identification card generates a weak current under the influence of the electromagnetic excitation signal. This weak current acts as a power source for the IC chip in the identification card. The IC chip in the identification card has an encrypted version of the user identity information. Under the effect of the electromagnetic excitation signal, the chip in the identification card can send the encrypted user identity information stored in the IC chip to the identification card reader 310. After receiving the encrypted user identity information by the antenna 311 and the RF module 312 of the identification card reader 310, the user identity information can then be obtained by the controller 313 following a decryption. The user identification information may be encrypted again before being sent to the intermediary platform 201, as discussed below.

It is appreciated that an IC identification card may also be read by a suitable IC card reader through direct contact instead of through RF frequency. In addition, even with the implementation using RF frequency, excitation range may be kept very small as to require an insertion of the IC identification card into a slot for the card to be excited.

In one embodiment, the IC identification card reader 310 has a first cipher 371, a second cipher 372 and a third cipher 373. The first cipher 371 is used to encrypt the user identity information using a first encryption key. The second cipher 372 is used to encrypt the bank account password using a bank encryption key. The third cipher 373 is used to encrypt the transaction amount, which can be done using the first encryption key.

The encrypted bank account password is sent to a participating bank subsystem 203 through the intermediary platform 202, which may or may not first decrypt the bank account password for verification and then encrypt the bank account password before sending it to the participating bank subsystem 203. In general, given that the encrypted bank account password is going to be decrypted and verified by the participating bank subsystem 203, an extra layer of decryption and encryption of the bank account password by the intermediary platform 202 may not be necessary, unless there is any reason to ensure a secure transmission between the accepting device 201 (e.g., 301A in FIG. 3A) and the intermediary platform 202.

The bank encryption key used by the second cipher 372 to encrypt the bank account password may be either provided by the participating bank or provided by a third party. In case where a third party bank encryption key is used, the third party also sends a corresponding decryption key to the contracted participating banks. It is appreciated that the intermediary platform 202 may act as a third party between the merchant and the bank to provide such encryption and decryption keys. Bank decryption keys of each participating bank can be different or the same, as long as each partici-pating bank can use the bank decryption key received to decrypt the bank account password.

The first encryption keys are keys agreed between the intermediary platform 202 and the merchants that use accepting devices 301A (201 in FIG. 2), and are used for secure communication between the intermediary platform and the merchants. The intermediary platform 202 intermediates between the communication of the accepting device 301A (201 in FIG. 2) and the participating bank subsystems 203. The accepting device 301A does not need to directly connect to the banks, but instead communicates with the banks through the intermediary platform 202. Each encryption key has a corresponding decryption key in the intermediary platform 202. If the first encryption key used by the accepting device 301A (201 in FIG. 2) is a private key, the first encryption key can be used to identify the accepting device 301A. In some embodiments, a unique correspondence between the first encryption keys and the accepting devices 301A are used in order to ensure unique identification. In other words, each first encryption key corresponds to one accepting device 301A. Upon receiving encrypted information from the accepting device 301A, the intermediary platform 202 finds a decryption key corresponding to the first encryption key and decrypts the received encrypted information. The intermediary platform 202 also saves the information decrypted using the first decryption key. This decrypted information may be used as a reference for later reconciliation among intermediary platform 202, accepting device 301A ((201 in FIG. 2) and the participating bank subsystem 203.

The first, second and third ciphers 371, 372 and 373 may be a software module integrated into a respective component. In the exemplary embodiment shown in FIG. 3A, for example, the first cipher 371 is a software module integrated into the controller 313 in the IC card reader 310, while the second cipher 372 and the third cipher 373 are software modules integrated into the acceptor processor 321. The first encryption key provided by the intermediary platform 202 is pre-installed in the controller 313 and the acceptor processor 321, while the bank encryption key, which is provided either by a participating bank or a third-party on behalf of a participating bank, is installed in the acceptor processor 321 only. After the first cipher 371 encrypts the user identity information using the first encryption key, the first cipher 371 sends the encrypted user identity information to the acceptor processor 321. The second cipher 372 of the acceptor processor 321 encrypts the bank account password using the bank encryption key (the second encryption key). The third cipher 373 uses the first encryption key to encrypt the transaction amount. Afterwards, the acceptor processor 321 sends this information (the encrypted user identity information, the encrypted bank account password and the encrypted transaction amount) in a pre-established format to intermediary platform 202 through the communication unit 325.

The first cipher 371 may be embodied in a security access module (SAM) installed in the controller 313 and used to decrypt the encrypted user identity information received by the IC card reader 310.

The choice of the controller 313 may depend on the characteristics of the IC identification cards used in the payment system as different IC identification cards may require a different type of encryption. One example of the controller 313 is used for the second-generation identification cards in China. This exemplary controller 313 is provided by a limited number of venders designated by the Ministry of Security of China.

FIG. 3B shows a schematic block representation of a second exemplary configuration of the first type accepting device in accordance with the present disclosure. Accepted device 301B is similar to accepting device 301A except for a different scene the configuration of the free ciphers 371, 372 and 373. In accepting device 301B, the first cipher 371 and the third cipher 373 are software modules integrated into the controller 313 while the second cipher 372 is a software module integrated into the acceptor processor 321. The first encryption key given by the intermediary platform 202 is only installed in the controller 313 while the bank encryption key is installed in the acceptor processor 321. Upon receiving the transaction amount entered by the merchant through input unit 323, the acceptor processor 321 transmits the transaction amount to the controller 313. The third cipher 373 in the controller 313 then encrypts the transaction amount. The controller 313 transmits the encrypted user identity information and the encrypted transaction amount to the acceptor processor 321. The acceptor processor 321 then sends the bank account password encrypted by the second cipher 372 and the encrypted information from the controller in a pre-established format to the intermediary platform 202 through the communication unit.

Figure 3C:
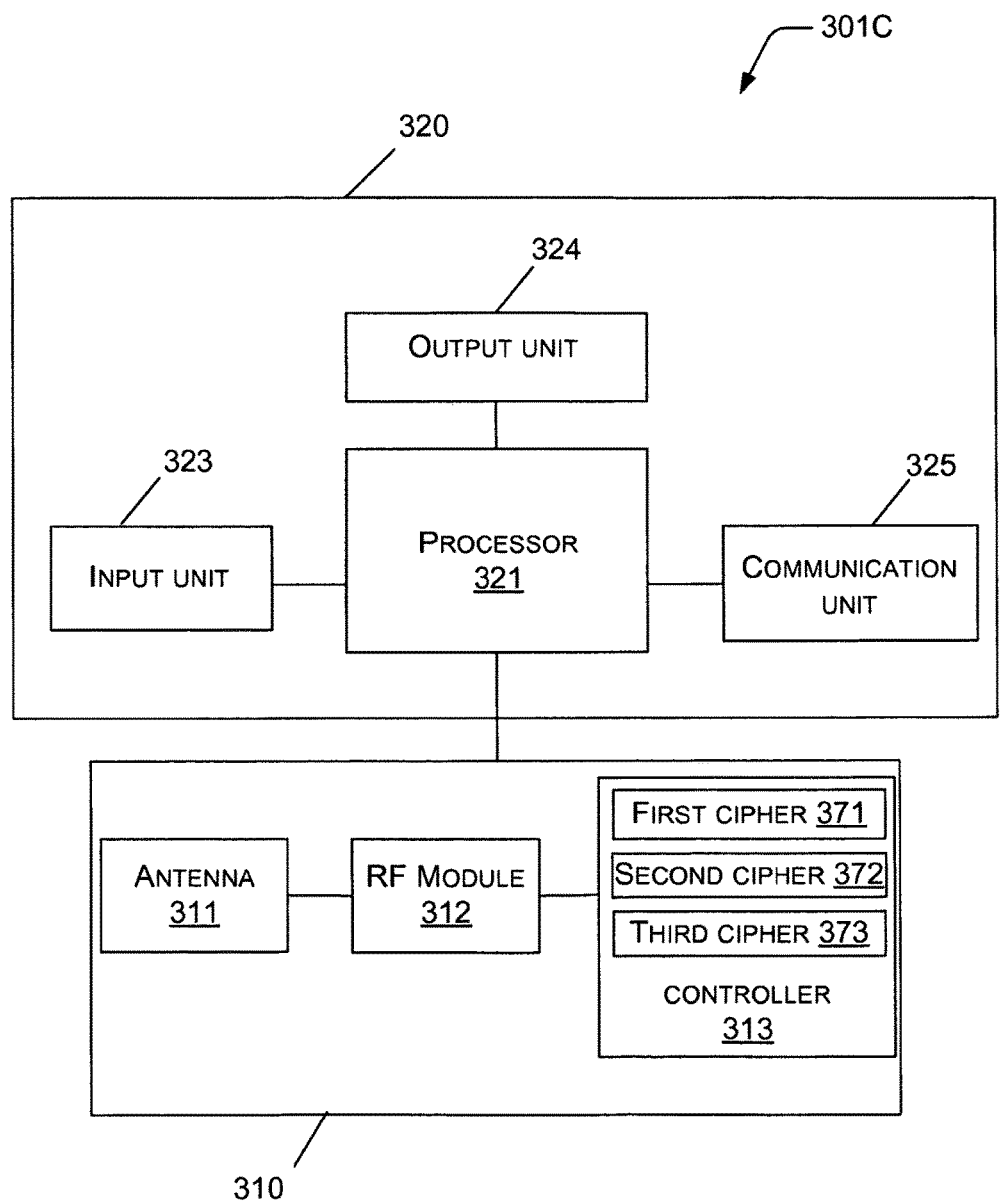

FIG. 3C shows a schematic block representation of a third exemplary configuration of the first type accepting device in accordance with the present disclosure. Accepted device 301C is similar to accepting devices 301A and 301B except for a different scene the configuration of the free ciphers 371, 372 and 373. In accepting device 301C, the first cipher 371, the second cipher 372 and the third cipher 373 are software modules integrated into the controller 313. The first encryption key and the bank encryption key are both installed in the controller 313. Upon receiving from input unit 323 the information such as the bank account password entered by the user and the transaction amount entered by the merchant, the acceptor processor 321 sends this information to the controller 313 for encryption. After encryption, the encrypted information is returned to the acceptor processor 321 which sends the encrypted information to the intermediary platform 202 through the communication unit 325.

The input unit 323 is used to receive information entered externally. Examples of externally entered information are a transaction amount entered by merchant, a bank account password entered by the user, and a combination of a bank account password entered by the user and information of a participating bank chosen by the user. The input unit 323 can be any input device such as a keyboard or a touch screen. Under normal conditions, the input unit 323 receives bank account password entered by user, information of participating bank and transaction amount entered by merchant. A bank encryption key corresponding to the participating bank is used to encrypt the bank account password entered by the user.

The output unit 324 is used to output a result of the transaction. The output unit 324 can be any output device such as a display or a printer. The output unit 324 is used to output (e.g., displaying on a screen or printing out through a printer) the result of the payment transaction so that the merchant and the user can determine whether the transaction is successful based on whether a bank account deduction has been successfully made. If the transaction is not successful, the output unit 324 may output the reasons that may have caused the transaction to be unsuccessful. In addition, the output unit 324 can print out the transaction result as evidence or documentation for the transaction completed.

The acceptor processor 321 connects to the input unit 323, the output unit 324 and the controller 223. The acceptor processor 321 is used to control different operations of the merchant in the transaction. Examples of such operations include transmitting information from the input unit 323 to the cipher 371, transmitting the information encrypted by the cipher 371 to the communication unit 325, and transmitting a processing result (such as a bank transaction result) returned from the communication unit 325 to the output unit 324. The acceptor processor 321 can be made from an existing Programmable Logic Device (PLD). For instance, the processor can use a single-chip microprocessor such as 510 series (89S52, 80C52, 8752, etc.) or any other suitable microprocessor.

The acceptor processor 321 may receive information such as user identity information and name of the user from the identification card reader 310 and display this information through the output unit 324. As the identification card reader 310 reads an identification card, it may reject the identification card if no machine-readable information or machine-readable image can be displayed. This happens usually because the identification card does not have properly encrypted information (which is likely to indicate a forged identification card), or the card is damaged. In this case, the transaction may be denied. Moreover, a representative of the merchant (e.g., a cashier) using the identification card reader 310 to read the identity information may compare the photo of the customer (the user) displayed in the identification card reader 310. If the photo and the physical appearance of the customer do not match (that is, the machine-readable information is not like the visual manifestation of the user seen by the representative), the representative of the merchant may conclude that the identification card does not belong to this customer and deny the transaction.

The acceptor processor 321 may receive and execute commands entered externally to complete corresponding tasks. Examples of external commands are outputting contents read by the identification card reader 310 to another external equipment, and updating locally stored bank encryption key when receiving an updated bank encryption key of a participating bank.

The acceptor processor 321 may also have an API interface which is used to establish connection between accepting device 201 (e.g., 301A, 301B or 301C in FIG. 3) and intermediary platform 202. This includes obtaining user identity information as well as entered transaction amount from the accepting device. The API interface on the accepting device may also carry out other procedures. Through the API interface, the accepting device 201 can establish a seamless connection with the intermediary platform 202. Connection between accepting device 201 and other external equipment can also be established through this API interface. The disclosed payment system may use an API interface installed on the accepting device 201 to accomplish high expandability and compatibility of the accepting device.

The communication unit 325 is used to establish the interaction with the intermediary platform. The communication unit 325 sends the encrypted information to the intermediary platform 202 and transmits the processing result from the intermediary platform 202 to the acceptor processor 321. The communication unit 325 may have a designated interface that supports network connection through a regular phone, a dial-up modem of any network or LAN. The communication unit 325 is primarily used for establishing connection between accepting device and intermediary platform 202. For example, the communication unit 325 on the accepting device may match a communication unit of the intermediary platform 202 to support communication through a modem of different dial-ups such as regular phone, GPRS and CDMA, and other designated communication ports.

The ciphers in this disclosure may be single-chip microprocessor(s), such as single-chip MCS, and maybe further embodied in a separate component rather than be integrated into the controller 313 or the acceptor processor 321, as will be described with reference to FIG. 6.

Figure 4:
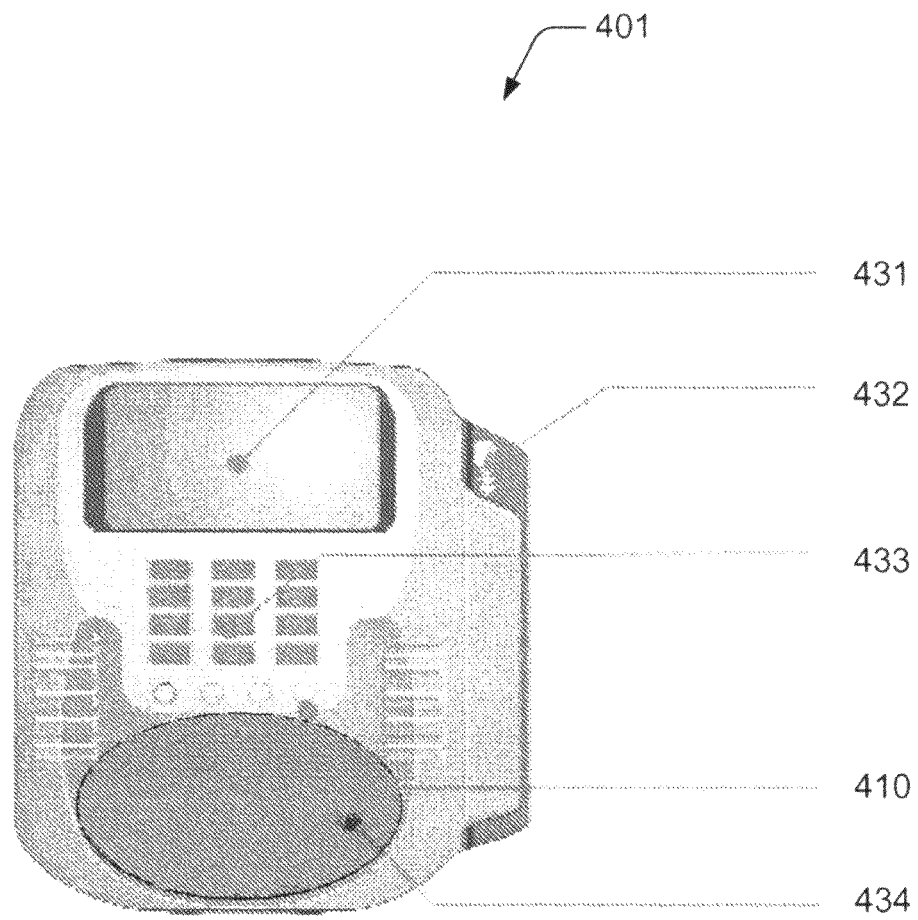
FIG. 4 is a schematic diagram of an exemplary accepting device in accordance with the present disclosure.

FIG. 4 is a schematic diagram of an exemplary accepting device in accordance with the present disclosure. The accepting device 401 should be understood with reference to other figures of the present description, such as FIGS. 2, 3, 5 and 6. The accepting device 401 has a box shape and includes a casing and internal structure. A display screen 431 is a part of an output unit (324) and is installed on the upper front side of the casing and is used for displaying information. For example, when an IC identification card is read, information in the IC identification card will be displayed on the display screen 431. Below the display screen 431 is a keyboard 433 which is part of an input unit (323) for entering information by user or merchant. Further below the keyboard 433 is installed an identification card reader 410. When the IC identification card is placed in reading zone 434, the information on the IC identification card is read by the identification card reader 410. Reading the IC identification card can be completed without direct contact between the IC identification card and the identification card reader 410. The identification card reader 410 continuously sends out an electromagnetic excitation signal through its coil. When an identification card is placed in the reading zone 434 of the card reader, the coil in the identification card will generate a weak current under the influence of the electromagnetic excitation signal. This current acts as a power source for the IC chip in the IC identification card. The chip contains user identity information. The IC chip of the identification card sends the user identity information to the identification card reader 410 to complete the reading operation with the effect of the electromagnetic excitation signal.

The identification card reader 410 sends the user identity information to a processor (321) installed in the internal structure of the accepting device 401. The processor (321) sends the received information to the display screen 431 for display. The processor (321) also sends separately a request message for the user to enter a bank account password and a request message for the merchant to enter a transaction amount to the display screen for display. This prompts the user to enter the bank account password and the merchant to enter the transaction amount.

The processor (321) receives the bank account password entered by the user and transaction amount entered by the merchant through the keyword 433. Upon encrypting the user identity information together with the bank account password and the transaction amount using ciphers, the processor (321) transmits this encrypted information to a communication unit (325). In this exemplary embodiment, the communication unit may use a special designated port 432 that connects to an opposite end through LAN.

The identification card reader 410 of the accepting device 401 can be provided by designated vendors. The user identity information, the transaction amount and the bank account password may be encrypted before sent to ensure the security of the data. Especially, in an embodiment where the ciphers (371, 372 and 373) are integrated into the controller (313) of the IC card reader 310, the merchant cannot modify the information in the controller. The safety of the encrypted information is thus further enhanced in this configuration.

Figure 5A:
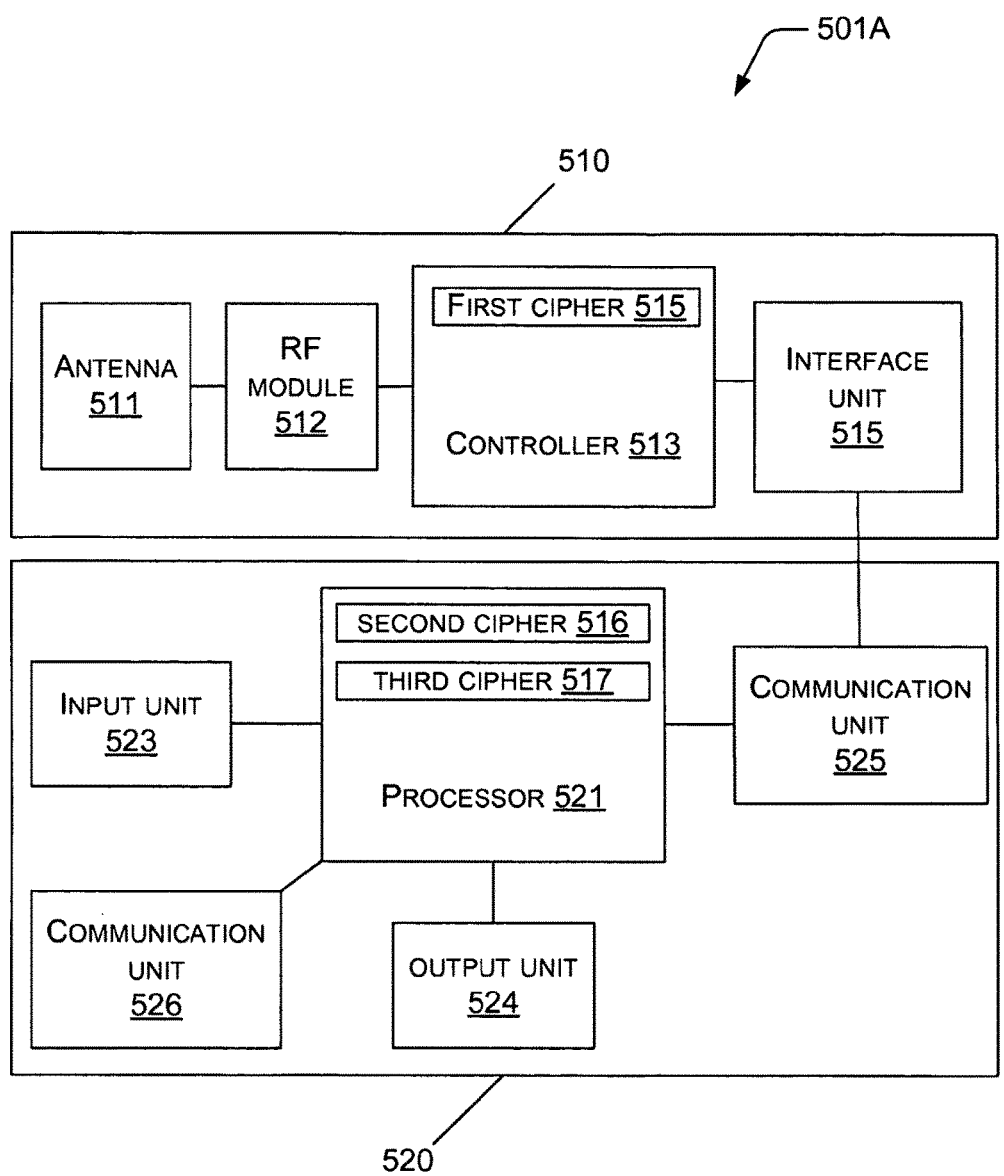
FIGS. 5A, 5B and 5C show schematic block representations of several exemplary configurations of a second type accepting device in accordance with the present disclosure.
Figure 5B:
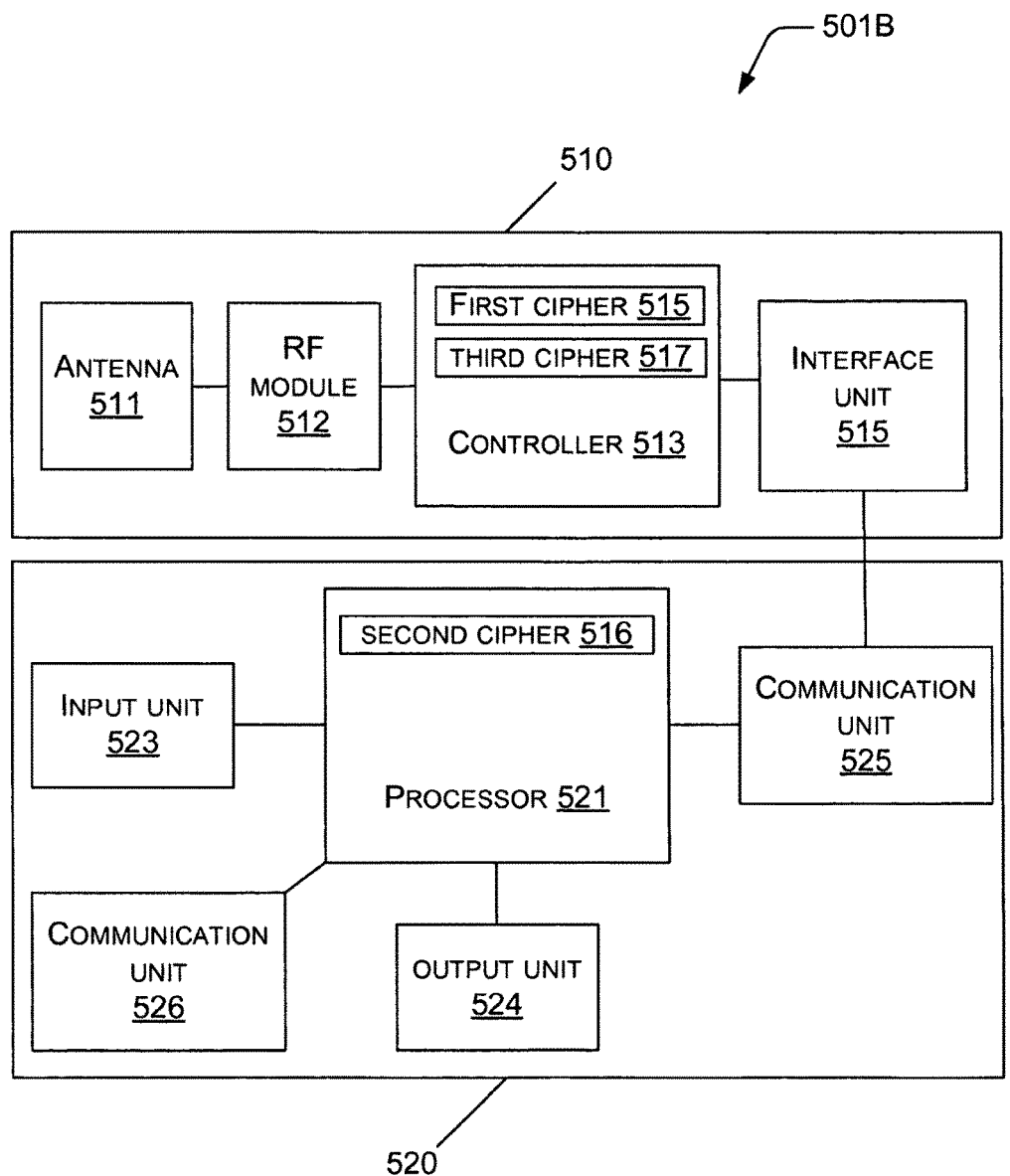
Figure 5C:
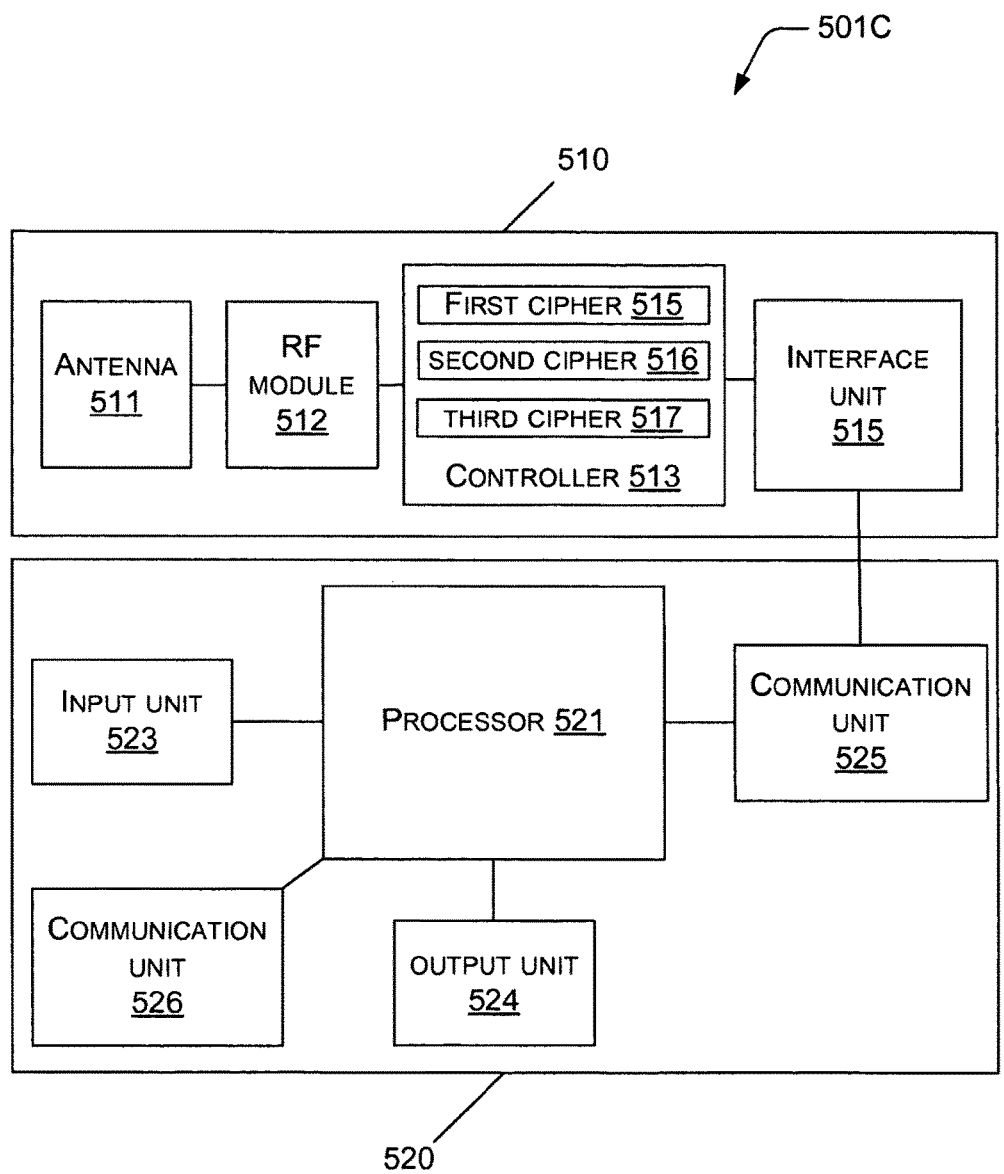

FIGS. 5A, 5B and 5C show schematic block representations of several exemplary configurations of a second type accepting device in accordance with the present disclosure. The accepting devices 501A, 501B and 501C of FIGS. 5A, 5B and 5B should be understood with reference to the payment system 200 of FIG. 2 by substituting one of the accepting devices 201 in FIG. 2 with the respective accepting device 501A, 501B or 501C of FIG. 5A, 5B or 5C.

FIG. 5A shows the first exemplary configuration of the second type of accepting device. Accepting device 501A has an identification card reader 510 and a computing terminal 520.

The identification card reader 510 consists of an antenna 511, a RF module 512, a controller 513 and an interface unit 514. The RF module 512 separately connects to the antenna 511 and the controller 513, while the controller 513 connects to the interface unit 514. The identification card reader 510 is used to read user identity information on a user identification card.

There ciphers, a first cipher 515, a second cipher 516 and a third cipher 517 are used for encryption and decryption. The first cipher 515 is used to encrypt user identity information using a first encryption key. The second cipher 516 is used to encrypt a bank account password using a bank encryption key either provided by a participating bank or provided by a third party. The third cipher 517 is used to encrypt transaction amount using the first encryption key.

In FIG. 5A, the first cipher 515 is a software module integrated into the controller 513, while the second cipher 516 and the third cipher 517 are integrated into the processor 521 as software modules.

FIG. 5B shows the second exemplary configuration of the second type of accepting device. Accepting device 501B is the same as accepting device 501A except for an alternative configuration of the three ciphers 515, 516 and 517. In accepting device 501B, the first cipher 515 and the third cipher 517 are software modules integrated into the controller 513 while the second cipher 516 is a software module integrated into the processor 521.

FIG. 5C shows the second exemplary configuration of the second type of accepting device. Accepting device 501C is the same as accepting devices 501A and 501B except for an alternative configuration of the three ciphers 515, 516 and 517. In accepting device 501C, the first cipher 515, the second cipher 516 and the third cipher 517 are all software modules integrated into the controller 513.

As described in connection to FIGS. 3A, 3B and 3C, different configurations of ciphers may require a slightly different flow of information between the IC identification card reader 510 and the computing terminal 520. The configuration of 501C in which all three ciphers are integrated in the IC identification card reader 510 may have the benefit of a better control of the encrypting devices as the IC identification card reader 510 may be fabricated under highly controlled circumstances by designated vendors.

The computing terminal 520 connects to the identification card reader 510 and includes an input unit 523, an output unit 524, a processor 521 and two communication units 525 and 526. The communication unit 525 connects to the identification card reader 510, while the communication unit 526 connects to the intermediary platform (202).

The input unit 523 is used to receive information entered externally. Examples of externally entered information are a transaction amount entered by merchant, a bank account password entered by user, and a combination of a user-entered bank account password and information of a participating bank chosen by user. The output unit 524 is used to output a transaction result.

The processor 521 connects to the input unit 523, the output unit 524 and the communication units 525 and 526. The processor 521 is used to transmit information from the input unit 523 to the identification card reader 510 for encryption, transmit the encrypted information to communication unit 526, and transmit a bank transaction result returned from the participating bank subsystem (203) and the intermediary platform (202) through the communication unit 526 to the output unit 524.

The communication units 525 and 526 connect to the processor 521 and are used to establish interaction with other equipment. The communication unit 525 connects to the identification card reader 510, and can use a port matching the interface unit 515 in the identification card reader 510. One example of such matching ports is USB ports. The communication unit 526 connects to the intermediary platform (202), and may be a designated interface that supports network connection through regular phone, a dial-up modem of any network or LAN to opposite ends.

In the accepting device 501A, 501B or 501C, the identification card reader 510 and the computing terminal 520 may be two individual components connected to each other. The identification card reader 510 can be modular and designed to work with any computing terminal that meets the interface requirements to complete a payment request.

Figure 6:
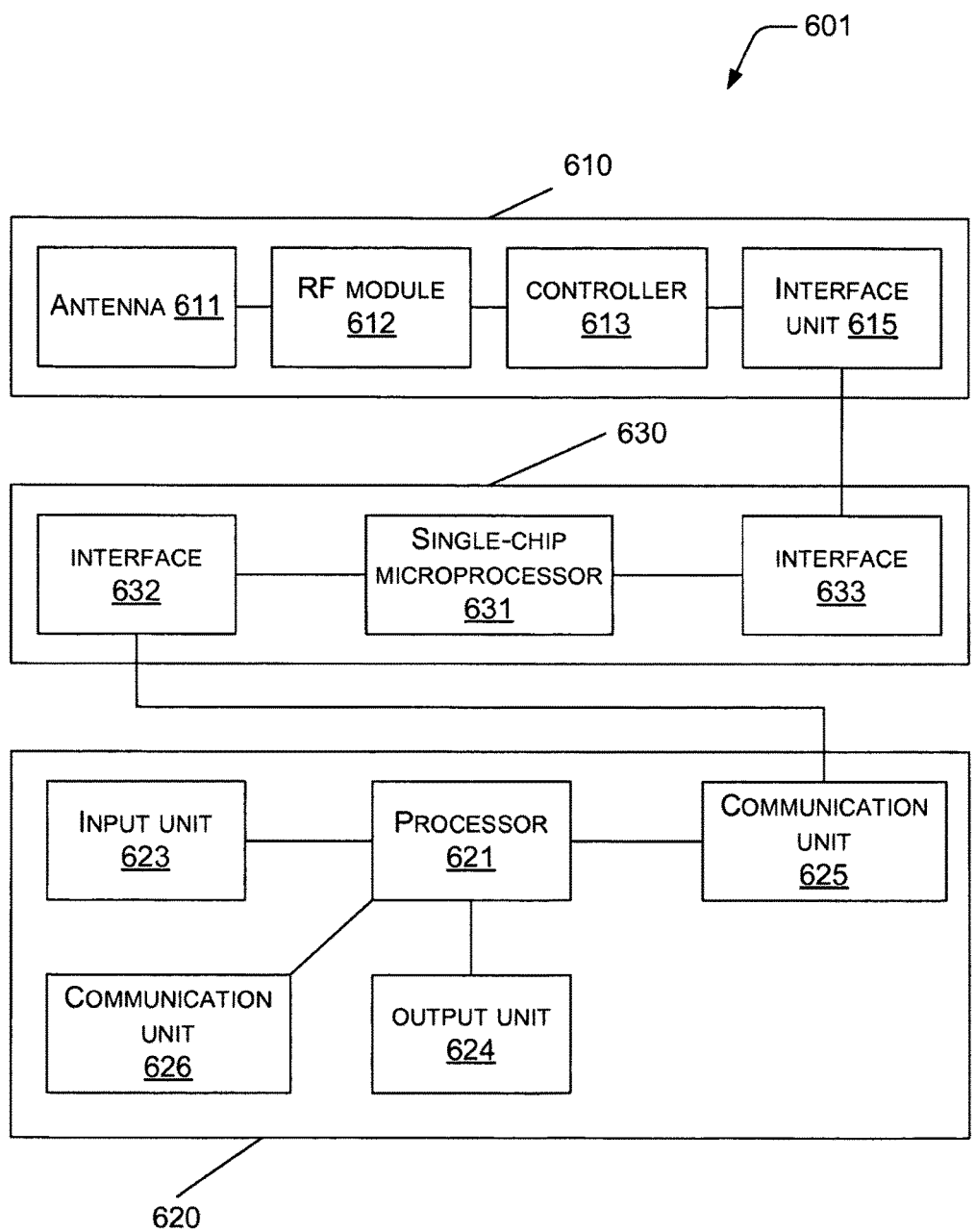
FIG. 6 is a schematic block representation of a third type accepting device in accordance with the present disclosure.

FIG. 6 is a schematic block representation of a third type accepting device in accordance with the present disclosure. An accepting device 601 has an identification card reader 610, a ciphering device 630 and a computing terminal 620.

The identification card reader 610 has an antenna 611, a RF module 612, a controller 613 and an interface unit 615. The RF module 612 connects to the antenna 611 and the controller 613 separately while the controller 613 connects to the interface unit 615. The identification card reader 610 is used to read user identity information, which includes at least a user identification card number, on a user identification card.

The ciphering device 630 has a single-chip microprocessor 631 and two interfaces 632 and 633. The single-chip microprocessor 631 connects to each interface 632 and 633. The single-chip microprocessor 631 is used to encrypt transaction amount and user identity information using a first encryption key. The single-chip microprocessor 631 is also used to encrypt bank account password using either a bank encryption key provided by a participating bank or a bank encryption key provided by a third party. The two interfaces 632 and 633 connect to the computing terminal 620 and the identification card reader 610, respectively.

The computing terminal 620 has an input unit 623, an output unit 624, a processor 621 and communication units 625 and 626, performing similar functions as that in the computing terminal 520. The processor 621 connects to the input unit 623, the output unit 624 and the communication units 625 and 626. The processor 621 is used to transmit information from the input unit 623 to the identification card reader 610 for encryption, transmit the encrypted information to the communication unit 626 (which connects to the intermediary platform), and transmit returned processing result to the output unit 624. The communication unit 625 is used to establish connection with the ciphering device 630. The communication unit 626 is used to establish connection with the intermediary platform (202).

In addition, the computing terminal 620 may also interact with the identification card reader 610 directly, either through the same communication unit 626 or via another communication unit (not shown) installed in computing terminal 620.

The communication unit 626 which connects to the intermediary platform may be a special designated interface that supports network connection through regular phone, a dial-up modem of any network or LAN to opposite ends. The communication unit 625 which interacts with the ciphering device 630 and the identification card reader 610 can be a USB port or any other suitable port that can establish such communication. The single-chip microprocessor 631 of the cipher device 630 may be an MCS51 model or a single-chip microprocessor of another type or model.

The above description only provides a few exemplary embodiments of accepting device 201 in accordance with this disclosure. The accepting device 201 may be embodied in a container of sufficient room as shown in FIG. 4 having installed therein all components (such as that shown in FIGS. 3, 5 and 6). Alternatively, the accepting device may be made up of two individual components. For example, the input unit, the output unit, the processor and the communication units of FIG. 5 are integrated in computing terminal 520, while the identification card reader 510 is embodied as another component. The identification card reader 510 and the computing terminal 520 are interconnected with each other through their respective interfaces. Alternatively, the accepting device may also be made up of three individual components. For instance, as in FIG. 6, the input unit, the output unit, the processor and the communication units are integrated in computing terminal 620. The ciphering device 630 and the identification card reader 610 are each embodied as an individual component. The cipher device 630 and the computing terminal 620 are interconnected with each other through their respective interfaces whereas the cipher device 630 and the identification card reader 610 are interconnected with each other through their interfaces.

In addition, the accepting device may also have an API interface used to establish connection between a merchant and the intermediary platform. The functions performed through the API interface include obtaining user identity information as well as transaction amount entered from the accepting device. The API interface on the accepting device may also carry out other functions. Through the API interface, the accepting device can establish a seamless connection with the intermediary platform. Connection between accepting device and other external equipment can also be established through this API interface. The API interface may be preinstalled in the accepting device to realize high expandability and compatibility.

In connection to the accepting device disclosed above, intermediary platform 202 and participating bank subsystem 203 in this disclosure are described as follows.

Figure 7:
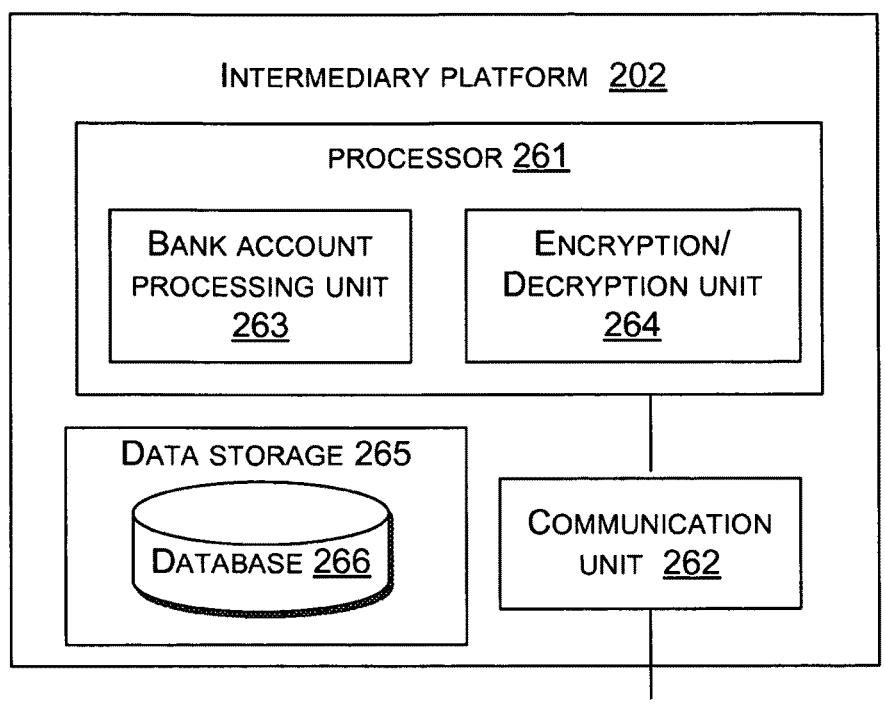
FIG. 7 shows further detail of intermediary platform 202 of FIG. 2.

FIG. 7 shows further detail of intermediary platform 202 of FIG. 2. As shown in FIG. 2, the intermediary platform 202 is primarily used to establish transaction between merchant and participating banks. An example of the intermediary platform 202 is Alipay platform of Alibaba Group Holding Ltd. User may first establish on the intermediary platform 202 the payment method which uses an identification card. This can be done by opening an account and registering user identification information at the intermediary platform 202. A participating bank of the participating bank subsystem 203 can sign a contract with the intermediary platform 202 to provide information such as user account information and encryption and decryption keys. During a payment transaction, a user who has a bank account with the participating bank only needs to select or provide the name of the bank and enter a bank account password at an accepting device to complete operations such as a payment and credit card pre-authorization.

The intermediary platform 202 may have a platform processor 261 including an encryption/decryption unit 264 (such as a cipher) and a communication interface 262. The encryption/decryption unit 264 is used to decrypt the encrypted information using a decryption key corresponding to the first encryption key provided to the accepting device 201.

The platform processor 261 saves the decrypted information in data storage 265 and sends transaction information (which may include both decrypted information and encrypted information) to the participating bank subsystem 203. The platform processor 261 also sends a bank transaction result returned from the participating bank subsystem 203 to accepting device 201 after storing the bank transaction result.

The data storage 265 of intermediary platform 202 has stored thereupon the first decryption keys corresponding to the encryption keys of each contracted accepting device 201. After the intermediary platform receives the encrypted information, the intermediary platform 202 finds the corresponding decryption key to decrypt the encrypted information. The information usually contains user identity information and may also contain a transaction amount. The intermediary platform 202 saves the first encryption key, the user identity information and the transaction amount after decryption. When the participating bank subsystem 203 returns a bank transaction result on whether the bank transaction (e.g., a deduction from the user's bank account) is successful, the intermediary platform 202 also saves the received bank transaction result. The intermediary platform 202 may use this saved information to perform reconciliation with the merchant and the participating bank in the future. The first encryption key can be a private key and the corresponding first decryption key will be a public key. With a private first encryption key, the intermediary platform 202 may readily verify the identity of the accepting device and the associated merchant conducting the transaction.

The platform processor 261 may further include a bank account processing unit 263 interacting with database 266. The database 266 contains a mapping relationship between the user identification card numbers and user bank accounts. Before carrying out the transaction, user can first register a bank account number that corresponds to the user identification card number in the intermediary platform 202. If a user identification card number corresponds to only one bank account number with a particular participating bank, such registration may not be necessary. But if multiple bank account numbers correspond to the same identification card number in the participating bank chosen by user for the payment, the user usually needs to either set up a unique bank account number in the intermediary platform 202, or make a unique selection of a paying bank at the accepting device 201 during the payment transaction.

After the platform processor 261 has decrypted the encrypted information from the accepting device 201, the platform processor 261 uses the user identification card number to search for a corresponding bank account in the database 266. If a corresponding bank account is found, the platform processor 261 sends the bank account number as part of the transaction information to the participating bank subsystem 203. The intermediary platform 202 and the participating bank 203 may have a pre-agreed data structure for transmission. The data structure may contain a field for bank account number. The bank account number found can be placed in the respective field to facilitate identifying and reading the bank account number by the participating bank subsystem 203.

The communication interface 262 establishes communication with the accepting device 201 and the participating bank subsystem 203.

In case where the transaction information does not contain a bank account number, the participating bank subsystem 203 may look up the bank account number corresponding to the user identification number in its own database and verify the decrypted bank account password. Upon verifying the decrypted bank account password, the participating bank subsystem processes the transaction and returns a bank transaction result.

The participating bank subsystem 203 usually has a bank processor and a bank database. The bank database stores bank account information which includes information of the account holder of a bank account, bank account number, bank account password and balance. The bank processor may have a data reading module, a decryption module and a transaction processing module. The data reading module is used to read a transaction request from the intermediary platform 202 and parse out information such as user identity information, encrypted bank account password and other bank account information from the transaction request. The decryption module decrypts the encrypted bank account password to obtain the bank account password.

When the transaction information contains a bank account information (e.g., a bank account number), the transaction processing module identifies the bank account by the bank account information, and compares the decrypted bank account password with the bank account password stored in the bank database. If the passwords are found matching, verification is successful and the transaction processing module then processes a debit transaction. If the passwords are found different, authentication fails. If the transaction information does not contain bank account information, the transaction processing module may find a bank account according to the user identification card number in the bank database. If more than one bank account number is found to correspond to the same identification card number in the participating bank, the participating bank subsystem 203 may either terminate the payment transaction or send a message to the intermediary platform to request the user to provide a specific bank account number for this payment.

Referring back to FIG. 7, in one embodiment of intermediary platform 202, the encryption/decryption unit 264 further encrypts the transaction information using a previously stored encryption key before sending the information to the participating bank subsystem 203. The previously stored encryption key is an encryption key agreed with the participating bank. Accordingly, the participating bank subsystem 203 may also have an encryption/decryption unit to encrypt the bank transaction result before sending the result to intermediary platform 202. The encryption/decryption unit 264 decrypts the transaction information received from the participating bank subsystem 203 using a previously stored decryption key. The previously stored decryption key is usually agreed (and may be provided) by the participating bank. The encryption/decryption unit of the participating bank subsystem 203 is used to decrypt the transaction information received using the corresponding decryption key.

Figure 8:
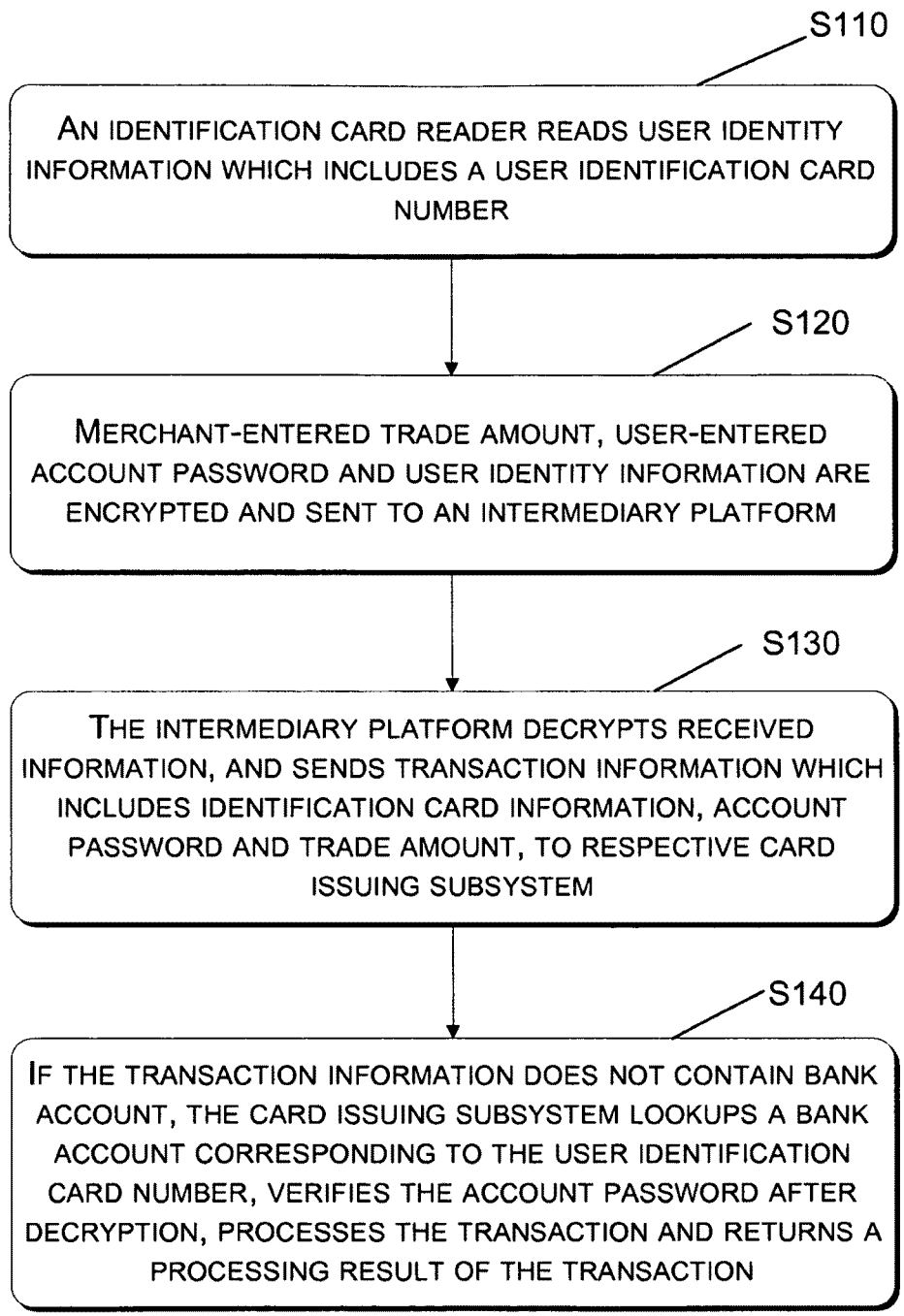
FIG. 8 is a flow chart of an exemplary process of the payment method using an IC identification card.

FIG. 8 is a flow chart of an exemplary process of the payment method using an IC identification card. In this description, the order in which a process is described is not intended to be construed as a limitation, and any number of the described process blocks may be combined in any order to implement the method, or an alternate method. The major blocks of the exemplary process is described as follows.

At S110, an identification card reader of an accepting device reads user identity information which includes a user identification card number. As the user identification card information is read by the identification card reader, a cipher of the identification card reader decrypts the user identification card information.

Under certain situations, the accepting device may need to display user identity information so that merchant can compare the information of card holder with that of the customer. To do this, the accepting device sends the user identity information to a processor contained therein, which displays the information through an output unit. If the merchant determines that the identity information of the customer does not match the manifestation of the card holder, the merchant may deny the payment.

At S120, a transaction amount entered by merchant, a bank account password entered by user and the user identity information are encrypted and sent to an intermediary platform. The user identification card information is encrypted using an encryption key agreed by the intermediary platform.

The user enters a bank account password and a respective bank as prompted at the output unit. The merchant enters a transaction amount as prompted at the output unit. As the processor receives the bank account password entered through an input unit, it encrypts the bank account password using a bank encryption key which is either provided by the participating bank or provided by a third party. As the processor receives the transaction amount entered through the input unit, the processor encrypts the entered transaction amount using a first encryption key.

At S130, the intermediary platform decrypts at least part of the encrypted information received, and transmits transaction information (which includes the identification card information, the bank account password and the transaction amount) to a respective participating bank subsystem. The part of the encrypted information to be decrypted by the intermediary platform includes at least the encrypted user identity information. In one embodiment, the intermediary platform uses a first decryption key corresponding to the first encryption key to decrypt the information, and stores the decrypted information; and in case where the information decrypted by the intermediate platform does not contain a bank account password, the intermediary platform may send the encrypted bank account password as part of the transaction information to the participating bank subsystem.

At S140, if the transaction information does not contain the bank account number, the participating bank subsystem looks up the bank account number corresponding to the user identification number and verifies the decrypted bank account password. Upon verifying the decrypted bank account password, the participating bank subsystem processes the transaction and returns a bank transaction result. Furthermore, if the participating bank subsystem finds more than one bank account number corresponding to the same identification card number in the participating bank, the participating bank subsystem may either terminate the payment transaction or send a message to the intermediary platform to request the user to provide a specific bank account number for this payment.

In one embodiment, the user bank account may be identified by the intermediary platform. In this case, the process may further include the following acts: (1) pre-storing at the intermediary platform a mapping relationship between user identification card numbers and user bank accounts; and (2) looking up the bank account number corresponding to the user identification card number from the mapping relationship, and if found, sending the bank account number as part of the bank transaction information to the participating bank subsystem.

Figure 9:
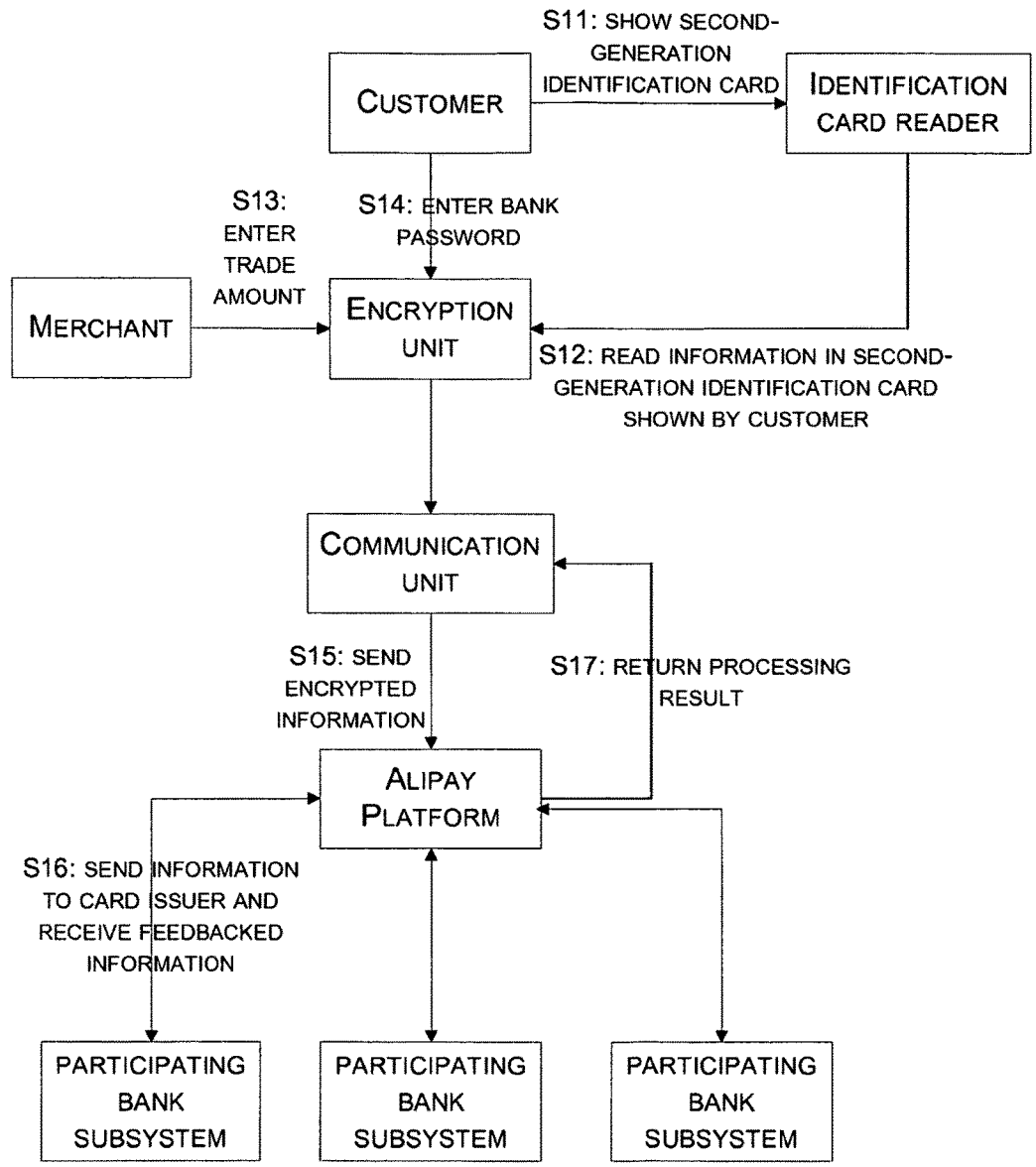
FIG. 9 illustrates an exemplary process of the payment method using Alipay payment platform as the intermediary platform.

FIG. 9 illustrates an exemplary process of the payment method using Alipay payment platform as the intermediary platform. The exemplary process is described as follows.

At S11, an identification card reader receives an IC identification card provided by a customer.

A S12, the identification card reader transmits identification card information read from the IC identification card to an acceptor processor.

At S13, a merchant enters an amount of current transaction through an input unit.

At S14, the customer selects or enters the name of a bank paying for the transaction and a respective bank account password through the input unit.

The processor uses a bank encryption key (which corresponds to the bank and may be provided by the bank and stored locally in advance) to encrypt the bank account password. The processor also uses a first encryption key which is stored in advance to encrypt the user identity information and the transaction amount.

At S15, the processor sends the encrypted information to Alipay payment platform through a communication unit.

At S16, Alipay payment platform decrypts the received information. If the information contains information of the bank selected by user, Alipay sends transaction information such as user identity information and transaction amount to the participating bank subsystem of the selected bank for processing. If the information does not contain participating bank information (e.g., the name of a bank), Alipay may send bank transaction request to multiple participating banks to identify a participating bank can match the user identification and successfully process the bank transaction. The bank transaction request may be sent to the banks one by one until a matching participating bank has been identified. One example of a bank transaction request is a request for a deduction from a user bank account to make a payment. If the requested bank transaction cannot be successfully processed by any of the participating banks, Alipay payment platform may return a bank transaction result indicating a failed transaction.

At S17, Alipay returns the bank transaction result (e.g., the result of a bank account deduction request) to the respective processor of the merchant. Depending on the bank transaction result received, the processor determines whether the transaction can continue.

The bank transaction result may be sent through Alipay payment platform. Alternatively, bank transaction result may be sent to the merchant and the user directly by the participating bank.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising: an accepting device, an intermediary platform, and a bank subsystem, wherein:

the accepting device comprising one or more accepting device processors and accepting device memory storing a first key, a bank key, and executable instructions that, when executed by the one or more accepting device processors, cause the one or more accepting device processors to perform acts comprising:
  sending out an electromagnetic excitation signal;
  receiving via an influence of the electromagnetic excitation signal identity information of a user from an identification card;
  receive receiving an amount associated with a transaction;
  receiving a bank password from the user;
  encrypting the identity information and the amount with a first key;
  encrypting a bank password with a bank key; and
  sending the encrypted identity information, the encrypted bank password, and the encrypted amount to the intermediary platform;
the intermediary platform comprising one or more intermediary platform processors and intermediary platform memory storing the first key and executable instructions that, when executed by the one or more intermediary platform processors, cause the one or more intermediary platform processors to perform acts comprising:
  decrypting the encrypted identity information and encrypted amount using the first key;
  locating a bank account number associated with the user based on the decrypted identity information from a database; and
  sending the bank account number associated with the user, the amount and the encrypted bank password to the bank subsystem;
the bank subsystem comprising one or more bank subsystem processors and bank subsystem memory storing the bank key and executable instructions that, when executed by the one or more bank subsystem processors, cause the one or more bank subsystem processors to perform acts comprising:
  decrypting the encrypted bank password using the bank key;
  determining that the decrypted bank password matches a stored password; and
  sending an approval based on the determination.

2. The system as recited in claim 1, wherein the accepting device comprising the one or more accepting device processors and the accepting device memory storing the first key, the bank key, and the executable instructions that, when executed by the one or more accepting device processors, cause the one or more accepting device processors to further perform receiving information of a name of a participating bank chosen by the user.

3. The current system as recited in claim 1, wherein the accepting device supports connection through a phone line or a network including a local area network (LAN).

4. The system as recited in claim 1, wherein the identity information includes a digital photo of the user.

5. The system as recited in claim 1, wherein the intermediary platform stores a mapping relationship between at least a portion of the decrypted identity information of the user and a bank account.

6. The system as recited in claim 5, wherein the intermediary platform finds the bank account associated with the user based on at least the portion of the decrypted identity information of the user and the mapping relationship.

7. The system as recited in claim 5, wherein the intermediary platform finds multiple bank account numbers associated with the user based on at least the portion of the decrypted identity information of the user.

8. The system as recited in claim 7, wherein the intermediary platform prompts the user to select the bank account number from the multiple bank account numbers.

9. The system as recited in claim 1, wherein the decrypted identity information corresponds to only one bank account number in a participating bank or a unique bank account number set up by the user in the intermediary platform.

10. The system as recited in claim 1, wherein the system further comprises the identification card, the identification card comprising an identification card issued by a government department and being different from bank cards issued by financial institutions.

11. A method comprising:
  storing by an accepting device a first key and a bank key;
  sending by the accepting device out an electromagnetic excitation signal;
  receiving by the accepting device via an influence of the electromagnetic excitation signal identity information of a user from an identification card;
  receiving by the accepting device an amount associated with a transaction;
  receiving by the accepting device a bank password from the user;
  encrypting by the accepting device the identity information and the amount with a first key;
  encrypting by the accepting device a bank password with a bank key; and
  sending by the accepting device the encrypted identity information, the encrypted bank password, and the encrypted amount to an intermediary platform;
  storing by the intermediary platform the first key;
  decrypting by the intermediary platform the encrypted identity information and encrypted amount using the first key;
  locating by the intermediary platform a bank account number associated with the user based on the decrypted identity information from a database; and
  sending by the intermediary platform the bank account number associated with the user, the amount and the encrypted bank password to a bank subsystem;
  storing by the bank subsystem the bank key;
  decrypting by the bank subsystem the encrypted bank password using the bank key;
  determining by the bank subsystem that the decrypted bank password matches a stored password; and
  sending by the bank subsystem an approval based on the determination.

12. The method as recited in claim 11, further comprising receiving by the accepting device information of a name of a participating bank chosen by the user.

13. The method as recited in claim 11, further comprising supporting by the accepting device connection through a phone line or a network including a local area network (LAN).

14. The method as recited in claim 11, wherein the identity information comprises a digital photo of the user.

15. The method as recited in claim 11, further comprising storing by the intermediary platform a mapping relationship between at least a portion of the decrypted identity information of the user and a bank account.

16. The method as recited in claim 15, further comprising finding by the intermediary platform the bank account associated with the user based on at least the portion of the decrypted identity information of the user and the mapping relationship.

17. The method as recited in claim 15, further comprising finding by the intermediary platform multiple bank account numbers associated with the user based on at least the portion of the decrypted identity information of the user.

18. The method as recited in claim 17, further comprising prompting by the intermediary platform the user to select the bank account number from the multiple bank account numbers.

19. The method as recited in claim 11, wherein the decrypted identity information corresponds to only one bank account number in a participating bank or a unique bank account number set up by the user in the intermediary platform.

* * * * *